United States Patent
Kahilainen et al.

(10) Patent No.: US 9,151,848 B2
(45) Date of Patent: Oct. 6, 2015

(54) DOSIMETRY SYSTEM, METHODS, AND COMPONENTS

(75) Inventors: Jukka Kahilainen, Discovery Bay, CA (US); Thomas D. Logan, Alamo, CA (US)

(73) Assignees: Mirion Technologies, Inc., San Ramon, CA (US); Mirion Technologies (IST) Corporation, Horseheads, NY (US)

( * ) Notice: Subject to any disclaimer, the term of this patent is extended or adjusted under 35 U.S.C. 154(b) by 598 days.

(21) Appl. No.: 13/326,215

(22) Filed: Dec. 14, 2011

(65) Prior Publication Data

US 2012/0154170 A1    Jun. 21, 2012

Related U.S. Application Data

(60) Provisional application No. 61/423,534, filed on Dec. 15, 2010, provisional application No. 61/428,796, filed on Dec. 30, 2010.

(51) Int. Cl.
| | |
|---|---|
| *G08B 23/00* | (2006.01) |
| *G01T 1/17* | (2006.01) |
| *H04Q 9/00* | (2006.01) |
| *G01T 1/02* | (2006.01) |
| *G01T 7/00* | (2006.01) |

(52) U.S. Cl.
CPC ... *G01T 1/17* (2013.01); *G01T 1/02* (2013.01); *G01T 7/00* (2013.01); *H04Q 9/00* (2013.01); *G08C 2201/93* (2013.01); *H04Q 2209/10* (2013.01); *H04Q 2209/43* (2013.01)

(58) Field of Classification Search
CPC .......................................................... G08B 1/08
USPC ................... 340/870.02, 870.01; 250/370.01, 250/370.07
See application file for complete search history.

(56) References Cited

U.S. PATENT DOCUMENTS

| | | | |
|---|---|---|---|
| 5,235,318 A | 8/1993 | Schulcz | |
| 5,739,541 A | 4/1998 | Kahilainen | |
| 6,490,929 B1 * | 12/2002 | Russell et al. | ................... 73/660 |
| 6,717,154 B2 | 4/2004 | Black et al. | |
| 6,792,487 B2 | 9/2004 | Kao | |
| 7,119,676 B1 * | 10/2006 | Silverstrim et al. | ........... 340/531 |
| 7,378,954 B2 * | 5/2008 | Wendt | ....................... 340/539.11 |

(Continued)

FOREIGN PATENT DOCUMENTS

| | | |
|---|---|---|
| CN | 1599320 | 3/2005 |
| CN | 101147668 | 3/2008 |

(Continued)

OTHER PUBLICATIONS

ISR for related PCT/US2011/064941 mailed on Jun. 2012.

(Continued)

*Primary Examiner* — Amine Benlagsir
(74) *Attorney, Agent, or Firm* — Ladas & Parry, LLP

(57) ABSTRACT

Dosimeters with wireless communications capability, upon actuation, communicate with a cell phone or other data capture and relay device (DCRD) with an application that allows communication with the dosimeters. The cell phone or other DCRD is a single device or part of an ad hoc network. The cell phone or other DCRD, once it receives raw data from a dosimeter, relays the data to a central station using mobile telephone or Wi-Fi or other communications networks. The data is processed at the central station, and available over the Internet or cell phone.

18 Claims, 4 Drawing Sheets

(56) References Cited

U.S. PATENT DOCUMENTS

| | | | |
|---|---|---|---|
| 7,518,504 B2* | 4/2009 | Peeters | 340/539.11 |
| 2004/0149918 A1* | 8/2004 | Craig et al. | 250/370.01 |
| 2004/0200967 A1 | 10/2004 | Russell | |
| 2004/0204915 A1* | 10/2004 | Steinthal et al. | 702/188 |
| 2005/0056791 A1 | 3/2005 | Donaghue et al. | |
| 2005/0248456 A1 | 11/2005 | Britton, Jr. | |
| 2006/0033034 A1 | 2/2006 | Kaplan et al. | |
| 2006/0136167 A1* | 6/2006 | Nye | 702/127 |
| 2008/0030597 A1 | 2/2008 | Olsen et al. | |
| 2008/0118087 A1* | 5/2008 | Cheyne | 381/107 |
| 2008/0169921 A1* | 7/2008 | Peeters | 340/539.11 |
| 2008/0217551 A1* | 9/2008 | Zhang et al. | 250/390.03 |
| 2008/0291744 A1 | 11/2008 | Hasvold | |
| 2009/0058663 A1* | 3/2009 | Joshi et al. | 340/584 |
| 2009/0146068 A1 | 6/2009 | Agarwal | |
| 2009/0272192 A1* | 11/2009 | Killion et al. | 73/647 |
| 2011/0063127 A1 | 3/2011 | Matsumoto et al. | |
| 2012/0154170 A1 | 6/2012 | Kahilainen | |

FOREIGN PATENT DOCUMENTS

| | | |
|---|---|---|
| JP | 11-258346 | 9/1999 |
| JP | H11-258346 | 9/1999 |
| JP | 2005-233806 | 9/2005 |
| KR | 10-2003-0000346 | 1/2003 |
| KR | 10-0529181 | 11/2005 |
| WO | 97/08568 | 3/1997 |
| WO | 2005/008286 | 1/2005 |
| WO | 2006/056916 | 6/2006 |
| WO | 2009/107444 | 9/2009 |
| WO | PCT/JP2009/051451 | 9/2009 |
| WO | WO 2009126582 A2 * | 10/2009 |
| WO | WO 2009157901 A1 * | 12/2009 |

OTHER PUBLICATIONS

WO for related PCT/US2011/064941 completed on May 25, 2012.
ISR for PCT/US2009/039676 mailed on Dec. 18, 2009.
IPRP/WO for PCT/US2009/039676 mailed on Dec. 18, 2009.
IPRP for related PCT/US2011/064941 completed on Apr. 3, 2013.
External search report for U.S. Appl. No. 61/428,796 dated Nov. 28, 2011.
ESSR dated Jul. 25, 2013 from corresponding European Patent Application No. 09730640.1.
Fiechtner, A., et al. "A prototype personal neutron dosemeter based on an ion chamber and direct ion storage." Individual Monitoring of External Radiation. European Workshop Sep. 4-6, 2000. vol. 96(1), Jul. 1, 2011. pp. 269-272, Radiation Protection Dosimetry Nuclear Technology Publishing UK.
Abson, et al. "A Twin Ion-Chamber system for Continuous Monitoring of Dose and Dose-Rate from Mixed Neutron and Gamma Radiation", Neutron Dosimetry: Proceedings of the Symposium on Neutron Detection, Dosimetry and Standardization Held by the International Atomic Energy Agency at the Atomic Energy Research Establishment, Harwell, England, Dec. 10-14, 1962, Symposium on Neu, vol. 2. Dec. 10, 1963, pp. 331-340.
Wernli, C., et al. "Direct ion storage dosimetry systems for photon, beta and neutron radiation with instant readout capabilities", Individual Monitoring of External Radiation. European Workshop Sep. 4-6, 2000 Helsinki, Finland, vol. 96(1), Jul. 1, 2011, pp. 255-259, Radiation Protection Dosimetry Nuclear Technology Publishing UK.
Kiuru, A., et al. "Comparison between direct ion storage and thermoluminescence dosimetry individual monitoring systems, and Internet reporting." Individual Monitoring of External Radiation. European Workshop Sep. 4-6, 2000. Helsinki, Finland, vol. 96(1), Jul. 1, 2011, pp. 231-233, Radiation Protection Dosimetry Nuclear Technology Publishing UK ISSN: 0144-8420.
Office Action for U.S. Appl. No. 13/966,201 mailed on Dec. 19, 2013.
Office Action for U.S. Appl. No. 12/936,357 mailed on Dec. 18, 2013.
Office Action for corresponding CN Appln. No. 201180059825.5 mailed on Nov. 14, 2014 and its English translation done by ABBYY PDF Transformer 3.0 and Google Translate.
Office Action for U.S. Appl. No. 13/966,201 mailed on Apr. 4, 2014.

* cited by examiner

DOSIMETRY SYSTEM, METHODS, AND COMPONENTS

RELATED APPLICATIONS

This writing claims priority to U.S. Ser. No. 61/423,534 filed on Dec. 15, 2010 and U.S. Ser. No. 61/428,796 filed on Dec. 30, 2010, both of which are incorporated herein by reference.

BACKGROUND

1. Field

This technology pertains generally to dosimetry, and more particularly to systems for collecting and analyzing dosimetry data, and most particularly to dosimetry data collection systems utilizing telecommunications for collecting data.

2. Description of Related Art

Personal dosimetry is used to monitor exposure of individuals to ionizing radiation. This is necessary for workers and visitors in a variety of locations, including nuclear reactors, and radiodiagnostic and/or radiotherapy centers. It may also be necessary for responders to terrorist acts that may involve radioactive material.

Personal dosimeters are typically compact passive devices worn by individuals. Various types of dosimeters are used, most commonly using film, thermoluminescent (TLD), or optically stimulated luminescent (OSL) detectors. One particular type of dosimeter that is highly advantageous is the direct ion storage ("DIS") dosimeter. The DIS dosimeter is based on a metal oxide field effect transistor (MOSFET). The charge on a floating gate is affected by radiation incident into a chamber surrounding the gate.

The dosimeters must be read at certain times to determine the exposure level of the wearer. While this may be done on site, usually such capability is lacking as readers are expensive. Dosimeters are often sent to a central processing lab where they are evaluated. This is somewhat cumbersome since it involves swapping dosimeters at the site and transporting them back and forth.

A better system would be one in which only the data, and not the physical dosimeter, is sent to a central processing station. A reader could be provided at each site for reading the data from each dosimeter. The data from the reader could then be transmitted electronically to a central station. However, such a system would require many readers located at various sites.

It would be preferable to not have any intermediate readers, but to send the data directly from the dosimeter itself to the central station. It also would be preferable to send this data from a dosimeter to a central station using a communications system based on readily available technology.

Accordingly it is desirable to provide a dosimetry data collection system in which raw data is sent from a dosimeter to a central processing station using readily available communications systems.

Some references of interest are WO/2009/107444 (Fuji Electric Systems) (PCT/JP2009/051451, US2011/0063127) and JPH11-258346 (Aloka Co. LTD.). In these references are the general components of: dosimeters that can communicate, relay devices, and central stations. One reference shows a system where wireless relay devices initiate collection of data from the dosimeters by transmitting a monitor indication request to the dosimeters. With this, the dosimeters are apparently always "on" to receive an interrogation signal whenever it is sent. The other reference shows a system where dosimeters are read at a fixed base station when the dosimeters are in close proximity to the base station. However, since some dosimeters may rarely if ever reach the base station, each dosimeter communicates with other dosimeters when they come into proximity with each other so that any dosimeter that then reaches a base station can provide its own and other dosimeter data. With this design, dosimeters seemingly must always be on to communicate with any other dosimeter when it is in close proximity. Both of these systems because of their "always on" requirements, rapidly drain battery power. Therefore, a need is seen for a dosimeter that is in a dormant state until the need to communicate arises.

SUMMARY

The present technology preferably includes apparatus for collecting dosimetry data at a central station, including a dosimeter with wireless communication capability for transmitting dosimeter data; at least one wireless data capture and relay device (DCRD), each DCRD having a dosimeter communication application allowing a dosimeter to communicate to the DCRD and transmit the dosimeter data to the DCRD; and a communications system for transmitting dosimeter data received by the DCRD to the central station.

The present technology also preferably includes a dosimeter, including a radiation detector; a control circuit connected to the radiation detector; a communications circuit connected to the control circuit; a power supply connected to the control circuit; and a wakeup actuator connected to the control circuit for actuating the communications circuit at selected times.

The present technology further preferably includes a communications device to receive data from a dosimeter and transmit the data to a central station, including a data capture and relay device (DCRD) having a communications circuit; and a dosimeter communications application connected to the communications circuit for allowing a dosimeter to communicate to the DCRD.

The present technology also preferably includes a method of collecting data from a dosimeter at a central station, by actuating the dosimeter to send data; establishing a wireless connection to a data capture and relay device (DCRD); wirelessly sending data from the dosimeter to the DCRD; and transmitting the dosimeter data from the DCRD to the central station.

The technology described herein further addresses and suggests as preferable, dosimeters that are normally dormant until needed. With this, this preferred design uses battery power only at the times it is desired to communicate. The dosimeters themselves, initiate all communication to relay devices, either by a push button or by internally generated timing periods.

Further aspects of the present technology will be brought out in the following portions of the specification, wherein the detailed description is for the purpose of fully disclosing preferred embodiments without placing limitations thereon.

BRIEF DESCRIPTION OF THE DRAWINGS

The invention will be more fully understood by reference to the following drawings, which are for illustrative purposes only.

DETAILED DESCRIPTION

Referring more specifically to the drawings, for illustrative purposes the present technology is embodied in the apparatus and method generally shown in FIG. 1 through FIG. 6. It will be appreciated that the apparatus may vary as to configuration and as to details of the parts, and the method may vary as to order and specific implementation of the steps, without departing from the basic concepts as disclosed herein.

One technical problem addressed by this technology is communication of raw data from dosimeters to a central processing station. The technology preferably uses dosimeters with wireless communications capability. Upon actuation, the dosimeters wirelessly communicate with a single cell phone or other data capture and relay device (DCRD) with an application that allows communication with the dosimeters, or with a wireless ad hoc network made up of cell phones or other data capture and relay devices (DCRDs) with an application that allows communication with the dosimeters. The cell phones or other DCRDs, once they receive raw data from the dosimeters, relay the data to a central station using mobile telephone or Wi-Fi or other wireless networks. The data is processed at the central station, and results are available from the central station over the Internet or cell phone or other communications device.

The system of the technology preferably uses one or more data capture and relay devices (DCRDs). A preferred DCRD is a cell phone, including smart phones such as the iPhone, Blackberry and Android. However, any other wireless communications device can be used, including but not limited to personal digital assistants (PDAs), tablet computers such as the iPad, lap top and desk top computers, and iPods. The DCRD does not have to be a telephone; it must only be able to wirelessly receive and relay the data. The following description of the invention uses a cell phone as an illustrative and preferred embodiment but any other DCRD may be substituted for the cell phone.

Figure 1:
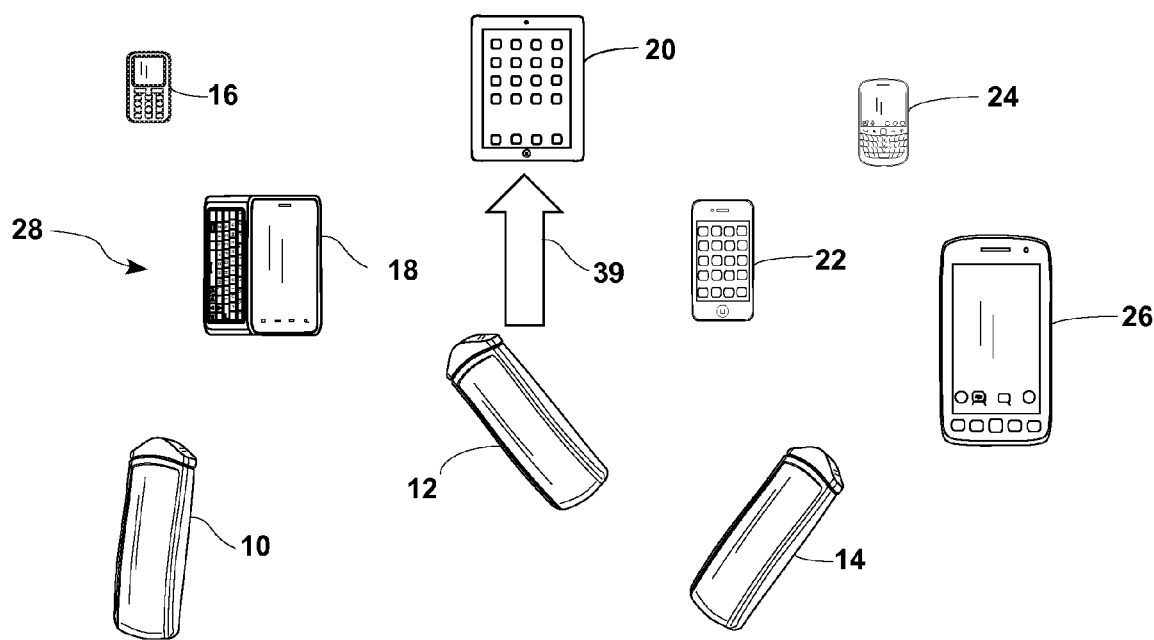
FIG. 1 is a simple block diagram of a cell phone wireless ad hoc network to which a plurality of dosimeters communicate according to the invention.

A simple block diagram of a part of the present technology is shown in FIG. 1. A plurality of dosimeters 10, 12, 14 communicate with a plurality of cell phones 16, 18, 20, 22, 24, 26 in a wireless ad hoc network 28. While three dosimeters and six cell phones are shown, any number may be used. The dosimeters 10, 12, 14 have wireless communications capability, preferably Bluetooth low energy (BLE) or ANT. Each cell phone 16, 18, 20, 22, 24, 26 has a dosimeter communications application which allows the dosimeters to contact the cell phones. While an ad hoc network 28 of a plurality of cell phones is shown, in the simplest system only a single cell phone, e.g. cell phone 20, is used, and all dosimeters communicate to the central station through that cell phone.

When a particular dosimeter 12 is actuated to send data, as further described below, it sends out a signal to the cell phones 16, 18, 20, 22, 24, 26 of ad hoc network 28. In an ad hoc network 28, any of the cell phones may establish a communications link with a particular dosimeter at any particular time. If cell phone 20 is available, handshake signals are exchanged between the cell phone and dosimeter, and a communications link is established. Dosimeter 12 then wirelessly transmits its data to cell phone 20, preferably by Bluetooth low energy (BLE) or ANT, as represented by arrow 30.

Figure 2:
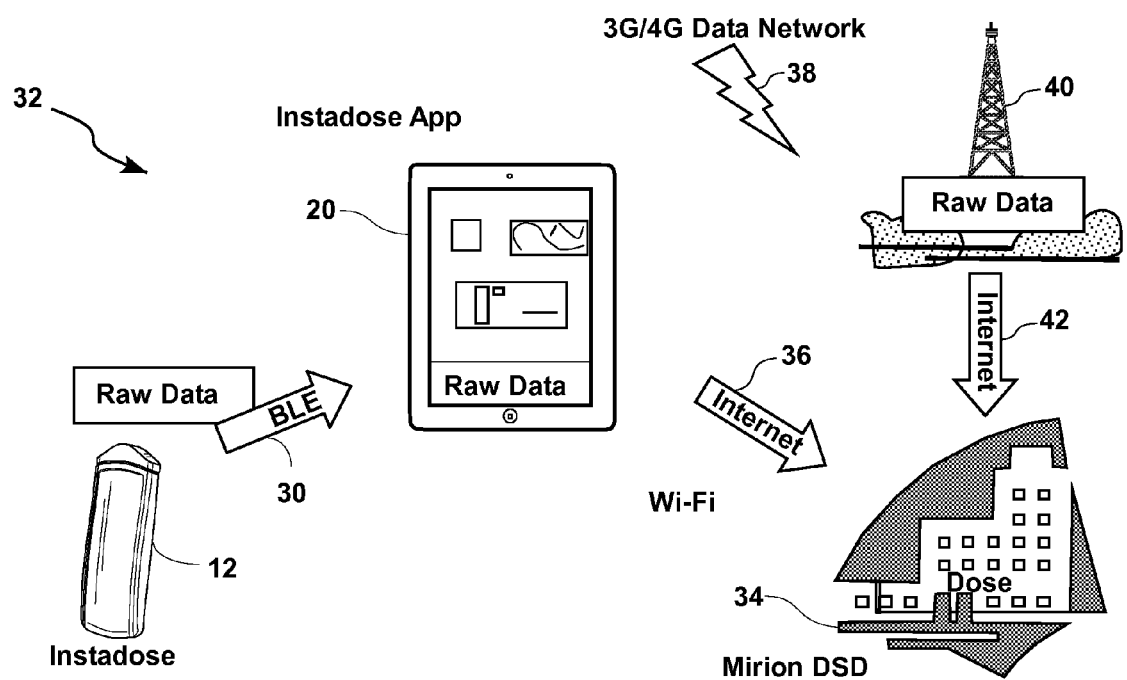
FIG. 2 is a simple block diagram of a dosimetry data collection system of the invention utilizing dosimeter data transmission over mobile telephone or Wi-Fi networks to a central processing station.

The basic structure of a dosimetry data collection system of the invention is illustrated in FIG. 2. Dosimetry data collection system 32 includes the plurality of dosimeters 10, 12, 14 and ad hoc cell phone network 28 or single cell phone 20 of FIG. 1. When a dosimeter establishes a communications channel with a cell phone of the ad hoc network, and sends data to the cell phone, e.g. dosimeter 12 sends data to cell phone 20 via Bluetooth as shown by arrow 30 as previously described and as shown in FIG. 2, the data is sent onward by cell phone 20 to central station 34 by any of numerous communications technologies or networks.

For example, data may be sent from cell phone 20 to central station 34 by Wi-Fi as represented by arrow 36. Alternately, data may be sent from cell phone 20 to central station 30 over a 3G or 4G data network, represented by symbol 38, using a cell phone tower 40, with the data transfer to station 30 represented by arrow 42. In general, any suitable communications technology may be utilized.

Figure 3:
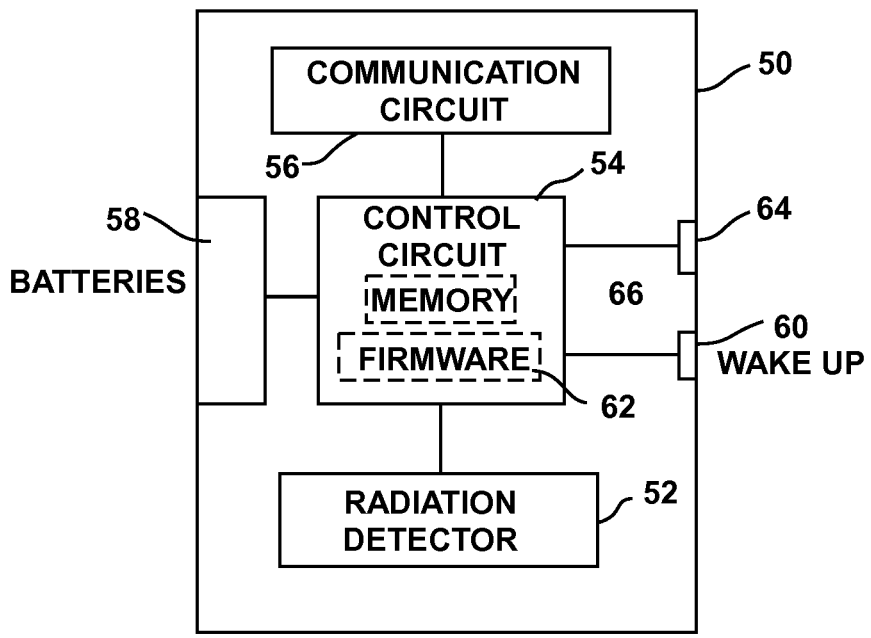
FIG. 3 is a simple block diagram of a dosimeter of the invention.

FIG. 3 illustrates a dosimeter 50 that forms a part of the invention. Dosimeter 50 includes a radiation detector 52, the sensor component that interacts with radiation and changes in a measurable manner in response thereto. Any type of radiation detector may be used if it produces an electronic output that may be communicated wirelessly. A MEMS (microelectromechanical system, also known as micro machines and micro systems technology) based dosimeter (e.g. the direct ion storage "DIS" radiation detector) is preferred. Other radiation detectors could also be used if a transducer is added to provide the necessary output signal, e.g. providing an LED and diode to detect changes in a film badge.

Dosimeter 50 includes control circuit 54 and communications circuit or interface 56 and is powered by a battery 58. Any suitable communications technology may be used. However, since all major smart phone applications have Bluetooth circuitry, Bluetooth is preferred. ANT (Wireless Personal Network by Dynastream Innovations, Inc.) is another preferred technology. Dosimeter 50 may also include an LED indicator circuit 64 that indicates certain parameters such as battery life or handshakes with other devices.

To prolong battery life, the dosimeter communications circuitry is only actuated at certain times. Dosimeter 50 includes a wakeup button or actuator, e.g. a push button 60, which is used to wake up the normally dormant communications circuitry of the dosimeter when it is desired to transmit data. The radiation detector 52 reacts to radiation exposure at any time, and the resultant output is the cumulative exposure. However, the data can be transmitted periodically. Push button 60 may be used to transmit data immediately, or programmable firmware 62 in the control circuit 54 may be used to configure wakeup intervals, e.g. every day, week or month as appropriate. On wakeup, the communications circuit 56 looks for cell phone handshake, and then transmits the data.

Control circuit 54 may also include a memory or register 66 to store data that has been transmitted to the cell phone. This data can be later retrieved if the cell phone fails to communicate to the central station. The stored data can include a transmission sequence number or timing data from which the central station can determine that a packet of data has not been received. The system administrator can then retrieve the missing data.

Figure 4:
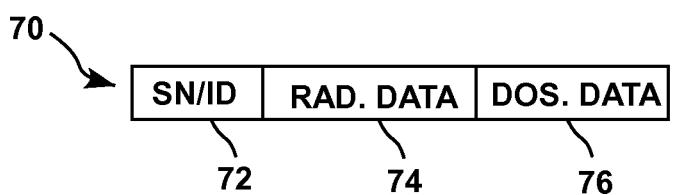
FIG. 4 illustrates a dosimeter data packet.

The data sent by dosimeter 50 to a cell phone is in the form of a packet 70 shown in FIG. 4. Data packet 70 includes dosimeter serial number and other identifying data 72. Data packet 70 also includes radiation data 74, which is the output of the radiation detector. Data packet 70 may also include other dosimeter data 76, e.g. battery condition or dosimeter location (e.g. GPS data).

Figure 5:
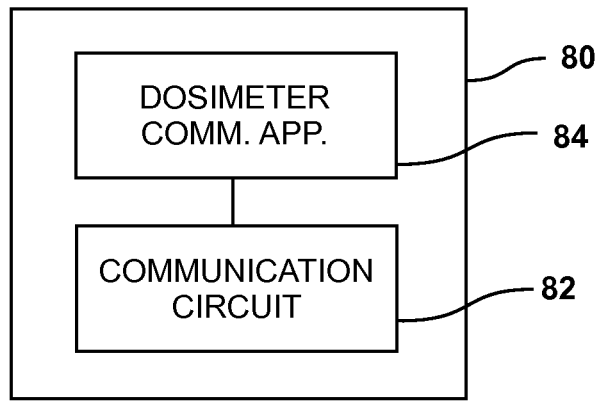
FIG. 5 is a simple block diagram of a cell phone of the invention.

Cell phone 80, shown in FIG. 5, is a standard phone that is adapted for the invention. Cell phone 80 includes a conventional communications circuit 82 and a dosimeter communication application 84 that allows the phone 80 to be part of the ad hoc network, i.e. to communicate with the dosimeters. Cell phone 80 may, for example, be any smart phone. Cell phone 80 is purely a communications link between the dosimeters and the central station. The transmission process is initiated by the dosimeter. No data processing is performed by the cell phone; it is just a transmission device.

Central station 34 contains a client server or other data processor to analyze all the data that it receives. The serial number/identifying data allows data from individual sensors to be analyzed to determine radiation dose, that is placed in a data base. Individuals with authorized access may then obtain the dosage data from the central station, e.g. by cell phone or over the internet.

Figure 6:
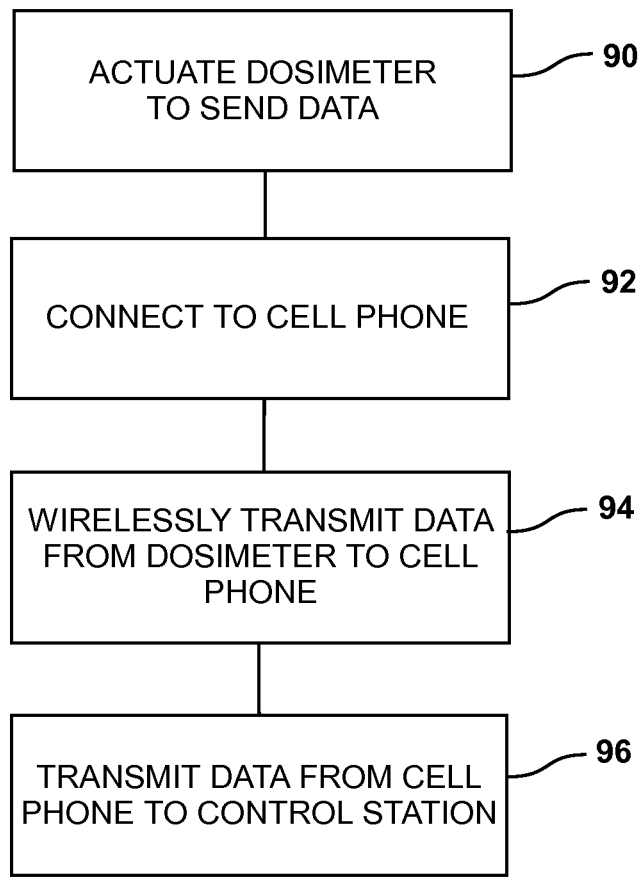
FIG. 6 is a flow chart of a method of the invention.

The present technology preferably includes a method of collecting data from a dosimeter at a central station. An illustrative flow chart is shown in FIG. 6. In step 90, a dosimeter is actuated to send data. In step 92, a wireless connection to a cell phone in an ad hoc network or to a single phone is established. In step 94 the data is wirelessly sent from the dosimeter to the cell phone. In step 98, the data is then relayed from the cell phone to the central station using various communications technologies.

The present technology preferably provides apparatus and method for effectively collecting data from a plurality of dosimeters and transmitting the data to a central station for processing. The invention has particular uses in monitoring radiation exposure for personnel at nuclear power plants and at medical centers performing radiodiagnostics and/or radiotherapy.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

All elements, parts, and steps described herein are preferably included. It is to be understood that any of these elements, parts and steps may be replaced by other elements, parts, and steps or deleted altogether as will be obvious to those skilled in the art.

Broadly this writing discloses at least the following: dosimeters with wireless communications capability, upon actuation, communicate with a cell phone or other data capture and relay device (DCRD) with an application that allows communication with the dosimeters. The cell phone or other DCRD is a single device or part of an ad hoc network. The cell phone or other DCRD, once it receives raw data from a dosimeter, relays the data to a central station using mobile telephone or Wi-Fi or other communications networks. The data is processed at the central station, and available over the internet or cell phone.

Concepts

This writing also discloses at least the following concepts.

Concept 1. Apparatus for collecting dosimetry data at a central station, comprising:
a dosimeter with wireless communications capability for transmitting dosimeter data, the wireless communications capability being normally dormant;
at least one wireless data capture and relay device (DCRD), each DCRD having a dosimeter communication application allowing a dosimeter to communicate to the DCRD and transmit the dosimeter data to the DCRD when the wireless communication capability is actuated and communication and transmission to the DCRD is initiated by the dosimeter;
a communications system for transmitting dosimeter data received by the DCRD to the central station.

Concept 2. The apparatus of concept 1 wherein the DCRD is a cell phone.

Concept 3. The apparatus of concept 1 or 2 wherein the at least one DCRD comprises an ad hoc network of DCRDs.

Concept 4. The apparatus of concept 1 wherein the communications system is a Wi-Fi system or a 3G or 4G data network.

Concept 5. The apparatus of concept 1 wherein the dosimeter wireless communication capability is Bluetooth or ANT.

Concept 6. The apparatus of any one of the preceding concepts wherein the dosimeter is a direct ion storage (DIS) dosimeter.

Concept 7. The apparatus of any one of the preceding concepts wherein the dosimeter further comprises a wakeup actuator to wake up the normally dormant communications capability of the dosimeter when desired.

Concept 8. A dosimeter, comprising:
a radiation detector;
a control circuit connected to the radiation detector;
a normally dormant communications circuit connected to the control circuit;
a power supply connected to the control circuit; and
a wakeup actuator connected to the control circuit for actuating the communications circuit at selected times.

Concept 9. The dosimeter of concept 9 wherein the radiation detector is a direct ion storage (DIS) detector.

Concept 10. The dosimeter of concept 8 or 9 wherein the communications circuit is a Bluetooth low energy (BLE) circuit or an ANT circuit.

Concept 11. A communications device for an ad hoc network to receive data from a dosimeter and transmit the data to a central station, comprising:
a data capture and relay device (DCRD) having a communications circuit; and
a dosimeter communications application connected to the communications circuit for allowing a dosimeter to communicate to the DCRD.

Concept 12. A method of collecting data at a central station from a dosimeter having normally dormant communications capability, comprising:
actuating the normally dormant communications capability of the dosimeter to send data;
establishing a wireless connection to a data capture and relay device (DCRD);

wirelessly sending data from the dosimeter to the DCRD; and transmitting the dosimeter data from the DCRD to the central station, wherein actuating the normally dormant communications capability, establishing a wireless connection, and wirelessly sending data are initiated by the dosimeter of selected times.

Concept 13. The method of concept 12 wherein the data is sent from the dosimeter to the DCRD by Bluetooth or ANT.

Concept 14. The method of concept 12 wherein the dosimeter data is sent from the DCRD to the central station by Wi-Fi or 3G or 4G data network.

Concept 15. The method of any one of the concepts 12-14 wherein the DCRD is a cell phone.

Concept 16. The method of concept 12, 13, or 14 wherein the normally dormant communications capability of the dosimeter is actuated by a push button on the dosimeter or at periodic intervals configured by programmable firmware in the dosimeter.

Concept 17. The apparatus/dosimeter of concept 7 or 8 wherein the wakeup actuator is a push button.

Concept 18. The apparatus/dosimeter of concept 7 or 8 wherein the wakeup actuator comprises programmable firmware for configuring wakeup intervals to periodically transmit data.

The invention claimed is:

1. An apparatus for collecting dosimeter data at a central station, comprising:
   a radiation detector;
   a control circuit connected to the radiation detector;
   a normally dormant communications circuit connected to the control circuit;
   a power supply connected to the control circuit; and
   a wakeup actuator connected to the control circuit for actuating the communications circuit at selected times,
   a dosimeter with wireless communications capability for transmitting the dosimeter data, the wireless communications capability being normally dormant;
   at least one wireless data capture and relay device (DCRD), the at least one wireless DCRD having a dosimeter communication application allowing the dosimeter to communicate to the at least one wireless DCRD and transmit the dosimeter data to the at least one wireless DCRD when the wireless communications capability is actuated and communication and transmission to the at least one wireless DCRD is initiated by the dosimeter; and
   a communications system for transmitting the dosimeter data received by the at least one wireless DCRD to the central station;
   wherein the dosimeter is a direct ion storage (DIS) dosimeter; and
   wherein the control circuit comprises a memory or a register to store the dosimeter data that has been transmitted therefrom, the stored dosimeter data including a transmission sequence number or a timing data from which the central station receiving the stored dosimeter data from the dosimeter can determine if a packet of the stored dosimeter data has not been received by the central station.

2. The apparatus of claim 1 wherein the at least one wireless DCRD further comprises a cell phone.

3. The apparatus of claim 1 wherein the at least one wireless DCRD further comprises an ad hoc network of DCRDs.

4. The apparatus of claim 1 wherein the communications system is a Wi-Fi system or a 3G or 4G data network.

5. The apparatus of claim 1 wherein the dosimeter with the wireless communications capability is Bluetooth or ANT.

6. The apparatus of claim 1 wherein the wakeup actuator is a push button.

7. The apparatus of claim 1 wherein the wakeup actuator comprises a programmable firmware for configuring wakeup intervals to periodically transmit data.

8. The Apparatus of claim 1, wherein said at least one wireless DCRD comprises a plurality of wireless DCRDs, each DCRD of the plurality of wireless DCRDs having the dosimeter communication application allowing the dosimeter to communicate to any of said each DCRD and transmit the dosimeter data to the at least one wireless DCRD when the wireless communications capability is actuated and communication and transmission to the at least one wireless DCRD is initiated by the dosimeter and established therebetween.

9. The Apparatus of claim 8, wherein the at least one wireless DCRD is a communications link between the dosimeter and the central station and wherein the dosimeter establishes the communications link to any available said each DCRD at any particular time.

10. A dosimeter, comprising:
    a radiation detector;
    a control circuit connected to the radiation detector;
    a normally dormant communications circuit connected to the control circuit;
    a power supply connected to the control circuit; and
    a wakeup actuator connected to the control circuit for actuating the communications circuit at selected times only when it is desired to transmit dosimeter data from the dosimeter,
    wherein
    the radiation detector is a direct ion storage (DIS) detector;
    the dosimeter with wireless communications capability for transmitting the dosimeter data, the wireless communications capability being normally dormant;
    at least one wireless data capture and relay device (DCRD), the at least one wireless DCRD having a dosimeter communication application allowing the dosimeter to communicate to the at least one wireless DCRD and transmit the dosimeter data to the at least one wireless DCRD when the wireless communications capability is actuated and communication and transmission to the at least one wireless DCRD is initiated by the dosimeter;
    a communications system for transmitting the dosimeter data received by the at least one wireless DCRD to a central station; and
    wherein the control circuit comprises a memory or a register to store the dosimeter data that has been transmitted therefrom, the stored dosimeter data including a transmission sequence number or a timing data from which the central station receiving the stored dosimeter data from the dosimeter can determine if a packet of the stored dosimeter data has not been received by the central station.

11. The dosimeter of claim 10 wherein the communications circuit is a Bluetooth low energy (BLE) circuit or an ANT circuit.

12. The dosimeter of claim 10 wherein the communications circuit is a Bluetooth low energy (BLE) circuit or an ANT circuit.

13. The dosimeter of claim 10 wherein the wakeup actuator is a push button.

14. The dosimeter of claim 10 wherein the wakeup actuator comprises a programmable firmware for configuring wakeup intervals to periodically transmit data.

15. A method for collecting dosimetry data at a central station, comprising:

providing a dosimeter with wireless communications capability for transmitting dosimeter data, the wireless communications capability being normally dormant;

providing a data capture and relay device (DCRD) that comprises a plurality of data capture and relay devices (DCRDs), each DCRD of the plurality of DCRDs having a dosimeter communication application allowing the dosimeter to communicate to any said each DCRD and transmit the dosimeter data to the DCRD when the wireless communications capability is actuated and communication and transmission to the DCRD is initiated by the dosimeter and established therebetween;

sending out a signal from the dosimeter when the wireless communications capability is actuated, the signal being received by any available said each DCRD at any particular time;

establishing a wireless communications link between the dosimeter and an available DCRD when the signal is received by the DCRD;

relaying the dosimeter data received by the DCRD to the central station through a communications system;

wherein the dosimeter is a direct ion storage (DIS) dosimeter and comprises:

a radiation detector;

a control circuit connected to the radiation detector;

a normally dormant communications circuit connected to the control circuit;

a power supply connected to the control circuit; and a wakeup actuator connected to the control circuit for actuating the communications circuit at selected times, wherein the control circuit comprises a memory or a register to store the dosimeter data that has been transmitted therefrom, the stored dosimeter data including a transmission sequence number or a timing data from which the central station receiving the stored dosimeter data from the dosimeter can determine if a packet of the stored dosimeter data has not been received by the central station; and wherein the DCRD is a communications link between the dosimeter and the central station.

16. The method of claim 15 wherein the plurality of DCRDs further comprises an ad hoc network of DCRDs.

17. The method of claim 15 wherein the DCRDs are cell phones.

18. The method of claim 15 further comprising determining at the central station that a packet of the stored dosimeter data sent by the dosimeter has not been received, and retrieving a missing stored dosimeter data from the dosimeter.

\* \* \* \* \*